(12) United States Patent  
Bosnar

(10) Patent No.: US 6,326,791 B1  
(45) Date of Patent: Dec. 4, 2001

(54) DISCRIMINATION OF METALLIC TARGETS IN MAGNETICALLY SUSCEPTIBLE SOIL

(75) Inventor: Miro Bosnar, North York (CA)

(73) Assignee: Geonics Limited, Mississauga (CA)

( * ) Notice: Subject to any disclaimer, the term of this patent is extended or adjusted under 35 U.S.C. 154(b) by 0 days.

(21) Appl. No.: 09/314,108

(22) Filed: May 19, 1999

(51) Int. Cl.$^7$ .............................. G01V 3/11; G01V 3/38
(52) U.S. Cl. ............................................ 324/329; 324/336
(58) Field of Search ................................. 324/239, 329, 324/334–337

(56) References Cited

U.S. PATENT DOCUMENTS

| | | | |
|---|---|---|---|
| 4,600,356 | * | 7/1986 | Bridges et al. ................ 324/336 X |
| 5,537,041 | * | 7/1996 | Candy ................................ 324/329 |
| 5,576,624 | * | 11/1996 | Candy ................................ 324/329 |
| 5,654,637 | * | 8/1997 | McNeill .............................. 324/329 |

FOREIGN PATENT DOCUMENTS

2041532 * 9/1980 (GB) .

* cited by examiner

*Primary Examiner*—Gerard R. Strecker  
(74) *Attorney, Agent, or Firm*—Ridout & Maybee

(57) ABSTRACT

A method is disclosed for discriminating electromagnetic responses of metallic objects in soil to application of an electromagnetic pulse from superposed responses due to magnetic susceptibility of the soil, comprising substantially eliminating, from at least a portion of the response, any component having a power law decay characteristic with an exponent which is characteristic of the soil.

8 Claims, 2 Drawing Sheets

DISCRIMINATION OF METALLIC TARGETS IN MAGNETICALLY SUSCEPTIBLE SOIL

FIELD OF THE INVENTION

This invention relates to the detection of metallic targets such as unexploded ordnance, mines and buried treasure by detecting the electro magnetic response of such targets when exposed to electromagnetic fields.

BACKGROUND OF THE INVENTION

In many parts of the world contamination of the electromagnetic response by effect of magnetic soil, produces signals that can be interpreted as a response from a wanted target. The problem is most often encountered by users of electromagnetic detectors in search for unexploded ordnance, mines and buried treasures.

It is known in electromagnetic surveying techniques to differentiate responses from different types of targets by processing data obtained with respect to time or displacement so as to obtain additional data which can be used to provide the desired differentiation.

For example, in U.S. Pat. No. 5,654,637 (McNeill), responses from receiver coils at different distances above terrain are scaled and summed to eliminate responses from a particular depth, such as a susceptible surface layer. This technique depends on wanted and unwanted responses occurring at different depths.

SUMMARY OF THE INVENTION

It has been observed, by laboratory and in situ measurements, that the response from magnetically susceptible soil, after being exposed to an electromagnetic pulse, as received by an induction coil, has a characteristic power law time decay response, linear when plotted on a log-log scale.

On the other hand response from a confined metallic target, such as bombs, mines or coins, will produce more complex non-linear log-log scale response, characterized by a relatively more slowly decaying initial response, followed by a more rapidly decaying late response.

According to the invention, there is provided a method for discriminating electromagnetic responses to application of an electromagnetic pulse of metallic objects in soil from superposed responses due to magnetic susceptibility of the soil, comprising substantially cancelling, from at least a portion of the response, any component having power law decay characteristic having an exponent which is characteristic of the soil. This cancellation can be performed in various ways, as further described below. The invention also extends to apparatus for performing the method.

SHORT DESCRIPTION OF THE DRAWINGS

DESCRIPTION OF THE PREFERRED EMBODIMENTS

Figure 1:
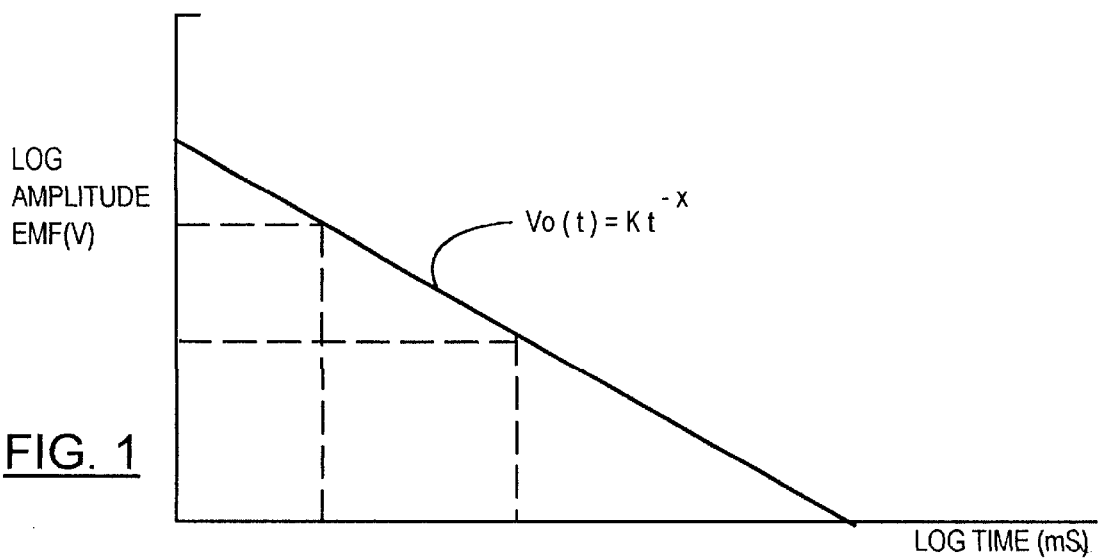
FIG. 1 is a log-log graph illustrating the decay of a typical response of electromagnetically susceptible soil to the application of a pulse electromagnetic field.

FIG. 1 illustrates the decay with time of the amplitude of the induced secondary electromagnetic response of a typical soil having magnetic susceptibility to application of a primary electromagnetic pulse, plotted on a log-log scale.

If the amplitude of the response with respect to time (t) is $V_0(t)$, the straight line response may be represented as $kt^{-x}$, where k is a constant and x is an exponent, whose values may vary according to the properties of the soil, although a typical value is around 1.3.

Figure 2:
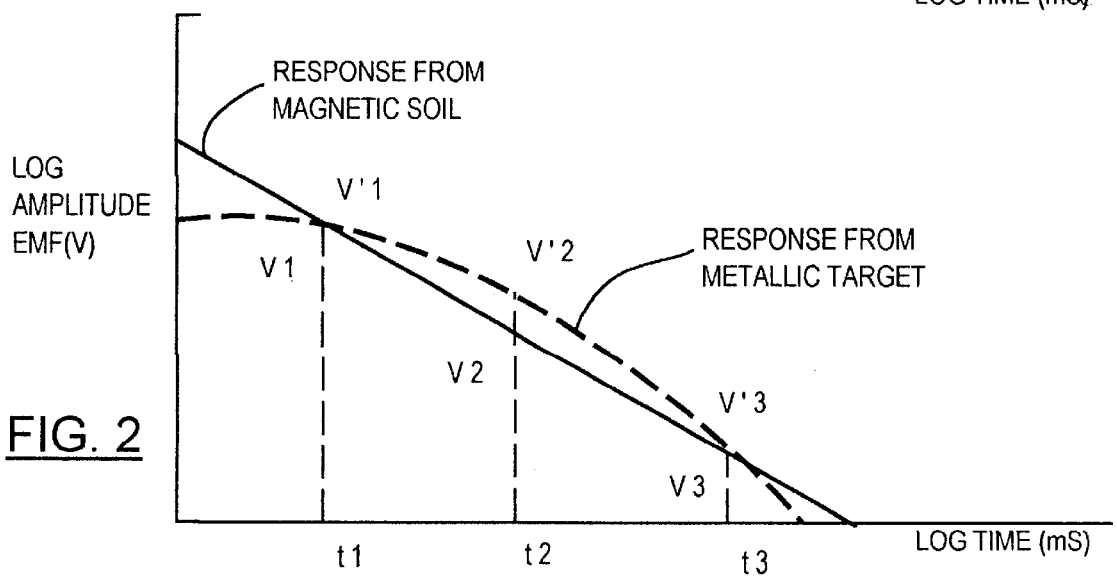
FIG. 2 is a log-log graph illustrating the decay of a typical response of a metallic target to the application of a pulse electromagnetic field.
Figure 4:
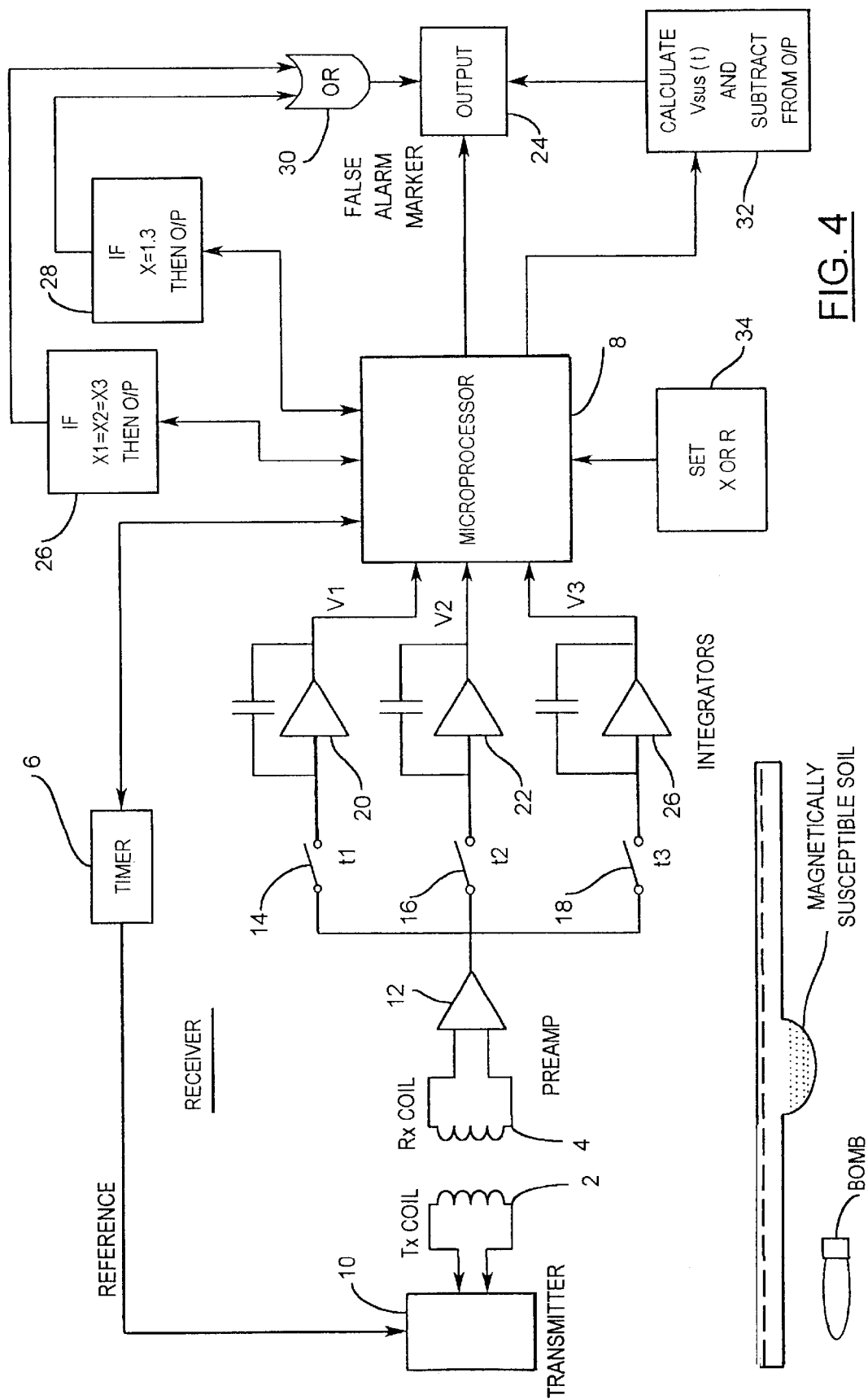
FIG. 4 is a schematic diagram of apparatus for carrying out the invention located over exemplary terrain exhibiting magnetically susceptible top soil of varying depth, and a buried metallic object.

FIG. 2 depicts typical responses both from magnetic soil (S in FIG. 4) and from a metallic target such as buried ordinance as (B in FIG. 4). By measuring the response at a minimum of three points in time ($t_1$, $t_2$, $t_3$), after the pulse excitation of the target, it can be determined that target has linear or non-linear time decay behaviour on the log-log scale. If we assume that at the time $t_1$, $t_2$ and $t_3$ induced signals $V_1$, $V_2$, $V_3$ (for magnetic soil) or $V_{1'}$, $V_{2'}$, $V_{3'}$, (for buried ordnance) respectively are observed, the following expressions result (only those for $V_1$, $V_2$ and $V_3$ are shown: those for $V_{1'}$, $V_{2'}$ and $V_{3'}$ are otherwise identical.

$$V_1(t) = kt_1^{-x} \tag{1}$$

$$V_2(t) = kt_2^{-x} \tag{2}$$

$$V_3(t) = kt_3^{-x} \tag{3}$$

from above:

$$\frac{V_1}{V_2} = \left(\frac{t_2}{t_1}\right)^x \longrightarrow x = \frac{\log\left(\frac{V_1}{V_2}\right)}{\log(t_2/t_1)} \tag{4}$$

or $$x_1 = \frac{\log\left(\frac{V_1}{V_2}\right)}{\log\left(\frac{t_2}{t_1}\right)} \tag{5}$$

$$x_2 = \frac{\log\left(\frac{V_1}{V_3}\right)}{\log\left(\frac{t_3}{t_1}\right)} \tag{6}$$

$$x_3 = \frac{\log\left(\frac{V_2}{V_3}\right)}{\log\left(\frac{t_3}{t_2}\right)} \tag{7}$$

and therefore:

if $x_1 \approx x_2 \approx x_3$ and it is in the range of $\approx 1.3$ (the $V_1$, $V_2$ $V_3$ case shown in FIG. 2) it is most likely that the response is from a magnetically susceptible soil. If the depth of soil varies, as at D in FIG. 4, the responses $V_1$, $V_2$, $V_3$ may vary, but x, $x_2$, $x_3$ should not. If the values of x, $x_2$ and $x_3$ are substantially unequal, then the $V_{1'}$, $V_{2'}$, $V_{3'}$ case is being considered, and the response is indicative of the presence of a metallic object or objects.

Measurement at two points in time, at $t_1$, and $t_2$ for example, can also be used to differentiate the two cases but with somewhat less certainty than when 3 points are used; it will be seen that in FIG. 2 for example the responses at $t_1$ and $t_3$ are identical in the two cases.

Due to a high cost of excavation, especially in the case of unexploded ordnance clean up, it is very important that false alarms from unwanted targets is recognized, and the invention provides a means for discriminating such unwanted responses.

A related method uses a simple ratio of two voltages at two measurement times to determine if the target responses behaves as one from susceptible soil, using the following expression to denote a value R:

$$R = \frac{V_1}{V_2} = \left(\frac{t_2}{t_1}\right)^x \quad (8)$$

If it is suspected that there is magnetic soil over the survey area, a base line measurement can be made over known susceptible ground to determine voltage ratio, and, afterwards use this value as indication of response from magnetic soil.

For example, if $$\frac{t_2}{t_1} = 3$$

and x is 1.3 then R=4.17

Figure 3:
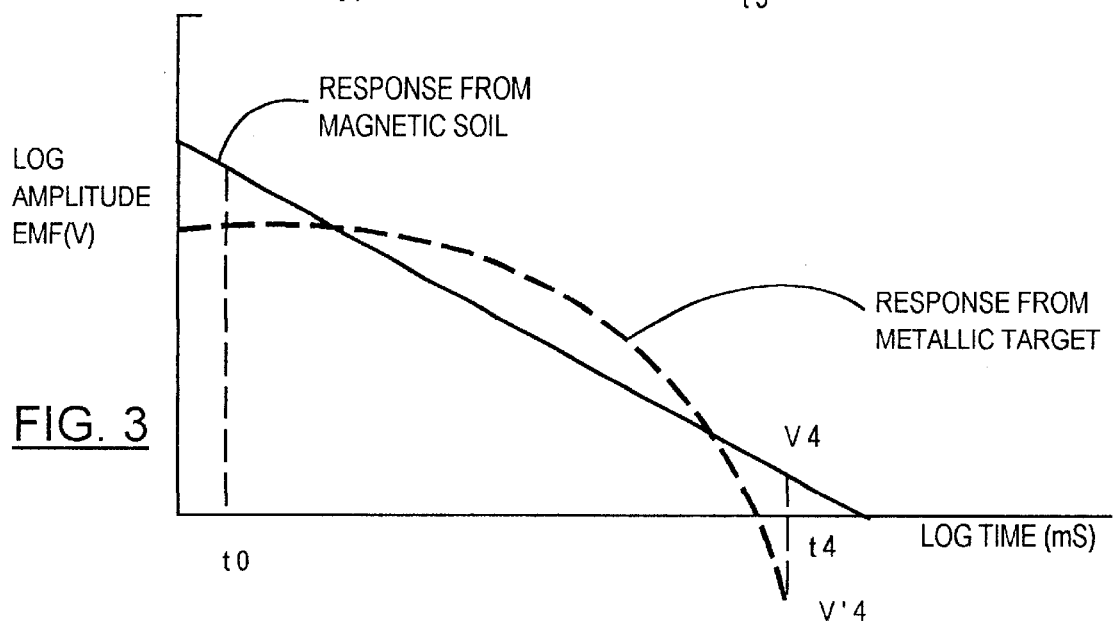
FIG. 3 is a graph combining the responses of FIGS. 1 and 2 and illustrating certain exemplary embodiments of the invention.

A variation of this method can also be used to remove the effect of soil susceptibility that is superimposed on the response from the wanted target, as illustrated in FIG. 3.

Since in general the late time response from a confined metallic target (e.g. bombs) is exponential in nature, it will decay with a much faster rate than the response from the soil.

If we make a measurement at a time $t_4$, response $V_4$ from the metallic target will be negligible in comparison with response from the soil ($V_4$). Thus since $$V_{TOT}(t) = V_{TG}(t) + V_{SUS}(t) \quad (9)$$

where:

$V_{TOT}(t)$ is total measured response $V_{SUS}(t)$ is response from soil $V_{TG}(t)$ is response from target at time $t \geq t_4$ $$V_{TOT}(t) \approx V_{SUS}(t) \quad (10)$$

since $V_{SUS}(t) = kt^{-x}$ and at $t=t_4$ $$V_{SUS}(t_4) = V_4 = Kt_4^{-x} \quad (11)$$

Therefore: $V_{sus}(t) = V_4 \left(\frac{t_4}{t}\right)^x \quad (12)$

Using the above we can calculate (measure) the response from the target along, in the following way:

$$V_{TG}(t) = V_{TOT}(t) - V_{SUS}(t) = V_{TOT}(t) - V_4 \frac{t_4^x}{t^x}$$

Since we know $$V_{TOT}(t) = V_{tot}(t) - V_{SUS}(t) = V_{TOT}(t) - \frac{V_4' \, _4^x}{t^x}$$

Since we know $V_{TOT}(t)$, $V_4$, $t_4$ and x, this can be calculated by instrument microprocessor automatically so that the instrument outputs only response from the target Measuring at a very early time ($t_0$), when the signal from the soil is considerably larger than the signal from the target, a similar result can be achieved.

FIG. 4 is a schematic diagram of apparatus for performing the method, including a transmitter coil 2 and a receiver coil 4. A timer circuit 6 (which may be implemented by a microcontroller also incorporating a microprocessor 8, random access memory, both volatile and non-volatile, or read-only memory storing a control program and operating parameters generates reference signals which cause a transmitter 10 connected to coil 2 to apply current pulses to the latter to subject terrain adjacent the coil to an electromagnetic field which collapses at the end of each pulse, inducing a secondary electromagnetic response from the terrain which in turn induces an electromotive force (EMF) in the receiver coil 4 which declines with elapsed time from the end of the pulse. This EMF is amplified by a preamplifier 12, and sampled by gates 14, 16 and 18 at elapsed times from the reference $t_1$, $t_2$ and $t_3$, set by the timer circuit 6. The samples are integrated by circuits 20, 22 and 26 and applied through the analog to digital converter 9 to input lines of the microprocessor 8, which also supplies outputs to a storage and display unit 24. The functions of blocks 26, 28, 30 and 32 shown connected between the microprocessor 8 and the display 24 may conveniently be implemented by routines embedded in the programming of the microcontroller. The block 26 calculates whether values of $x_1$, $x_2$ and $x_3$ (see above) are equal within a predetermined tolerance, indicating a straight line log-log response characteristic of magnetically susceptible soil, and the block 28 calculates whether these values approximate to 1.3, again characteristic of the responses from electromagnetically responsive soil. The outputs from the blocks are Ored in block 30 to provide a false alarm marker which inhibits the display 24 from indicating a "hit" or suspected buried metal object.

Following a technique as described with reference to FIG. 3, the block 32 calculates the magnetic susceptibility of the soil and subtracts it from the response obtained, to isolate that portion of the response occasioned by targets other that magnetically susceptible soil. This response is displayed on display 24 unless inhibited by the false alarm marker. A block 34 enables selection of the calculation technique to be used, based on evaluating x or evaluating R as the case may be.

It will of course be understood that the above implementation is exemplary only and any apparatus may be utilized capable of implementing the method of the invention as set forth in the appended claims. For example, complete pulse responses could be collected and stored in the field, and subsequently sampled and analyzed by separate apparatus using the same principles as set forth above.

What is claimed is:

1. A method for discriminating electromagnetic responses of metallic objects in soil from superposed responses due to magnetic susceptibility of the soil, said method comprising the steps of;

(a) applying an electromagnetic pulse in the vicinity of the metallic object in the soil;

(b) inputting the electromagnetic responses of the metallic object and the soil;

(c) digitally recording the electromagnetic responses;

(d) applying an operation to the electromagnetic responses to generate an exponential characteristic for the soil which is differentiable from an exponential characteristic associated with the electromagnetic response of the metallic object.

2. The method according to claim 1, wherein said step of applying an operation comprises calculating exponents of the electromagnetic response at multiple elapsed times after application of the electromagnetic pulse.

3. The method according to claim 2, wherein said step of applying an operation comprises comparing the calculated exponents, and rejecting the electromagnetic response if the calculated exponents are substantially equal.

4. The method according to claim 2, comprising calculating the exponents of the electromagnetic response for at least three elapsed times after application of the electromagnetic pulse.

5. The method according to claim 2, comprising rejecting the response as an electromagnetic response for a metallic object if the exponents calculated at the multiple elapsed times approximate to 1.3.

6. The method according to claim 2, wherein one of the elapsed times is selected such that an electromagnetic response from a buried metal object will be small compared to the electromagnetic response from magnetically susceptible soil.

7. The method according to claim 6, wherein the selected elapsed time is very early in the electromagnetic response.

8. The method according to claim 7, wherein the selected elapsed time is late in the electromagnetic response, when the electromagnetic response from any buried metal object has fallen to a negligible level.

* * * * *